United States Patent
Ley et al.

(10) Patent No.: US 6,594,613 B1
(45) Date of Patent: Jul. 15, 2003

(54) ADJUSTABLE BANDWIDTH FILTER FOR PROCESS VARIABLE TRANSMITTER

(75) Inventors: Kevin Ley, Coon Rapids, MN (US); David C. Bohn, Eden Prairie, MN (US); David L. Wehrs, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/209,134

(22) Filed: Dec. 10, 1998

(51) Int. Cl.[7] .............................................. H04B 15/00
(52) U.S. Cl. ....................... 702/140; 702/190; 702/191; 702/193; 327/553; 327/555
(58) Field of Search ........................... 702/140, 33, 38, 702/45, 50, 55, 57, 69, 98, 100, 104, 105, 107, 124, 111, 113, 114, 116, 122, 127, 138, 182–184, 188–191, 193, 195, 197, FOR 103, FOR 104, FOR 119, FOR 123, FOR 124, FOR 127, FOR 128, FOR 134, FOR 135, FOR 143, FOR 156, FOR 164, FOR 166, FOR 170, FOR 171; 700/9, 12, 13, 19, 21, 26, 31–35, 37, 54, 55, 79, 266, 279, 281, 282, 301; 708/300, 309, 311, 819; 381/94.7, 94.9, 92, 94.1–94.3, FOR 123, FOR 124; 327/309–312, 553, 551, 552, 555–557; 330/303–306; 324/613, 614, 616, 619, 612, 76.28, 76.29, 76.31, 76.44–76.46; 73/1.16, 1.59, 1.73, 861.02, 861.03, 861.354, 861.356, 861.22; 341/155; 340/511

(56) References Cited

U.S. PATENT DOCUMENTS

| | | | | |
|---|---|---|---|---|
| 4,545,258 A | | 10/1985 | Coursolle | 73/861.22 |
| 4,598,251 A | | 7/1986 | Wehrs | 328/140 |
| 5,128,625 A | * | 7/1992 | Yatsuzuka et al. | 327/557 |
| 5,337,367 A | | 8/1994 | Maeda | 381/94 |
| 5,339,335 A | * | 8/1994 | Molnar | 702/193 |
| 5,416,593 A | | 5/1995 | Vercruysse | 356/429 |
| 5,469,087 A | * | 11/1995 | Eatwell | 327/555 |
| 5,555,190 A | * | 9/1996 | Derby et al. | 73/861.356 |
| 5,576,497 A | * | 11/1996 | Vignos et al. | 73/861.22 |
| 5,705,978 A | * | 1/1998 | Frick et al. | 340/511 |
| 5,867,058 A | * | 2/1999 | DeCarlo, Jr. | 327/557 |
| 5,909,188 A | * | 6/1999 | Tetzlaff et al. | 341/155 |

FOREIGN PATENT DOCUMENTS

| | | |
|---|---|---|
| CA | 1300924 | 5/1992 |
| JP | 05203761 | 8/1993 |
| WO | WO 98/37391 | 8/1998 |

* cited by examiner

*Primary Examiner*—Hal Wachsman
(74) *Attorney, Agent, or Firm*—Westman, Champlin & Kelly, P.A.

(57) ABSTRACT

A process variable transmitter providing a transmitter output representing a process variable sensed by a sensor. The transmitter has a filter with a bandwidth which is automatically adjusted based on noise detected in a sensor output. When the transmitter senses higher sensor noise levels, it automatically decreases the bandwidth to damp noise in the transmitter output. When the transmitter senses lower sensor noise levels, it automatically increases the bandwidth to provide faster response to changes in the process variable.

30 Claims, 11 Drawing Sheets

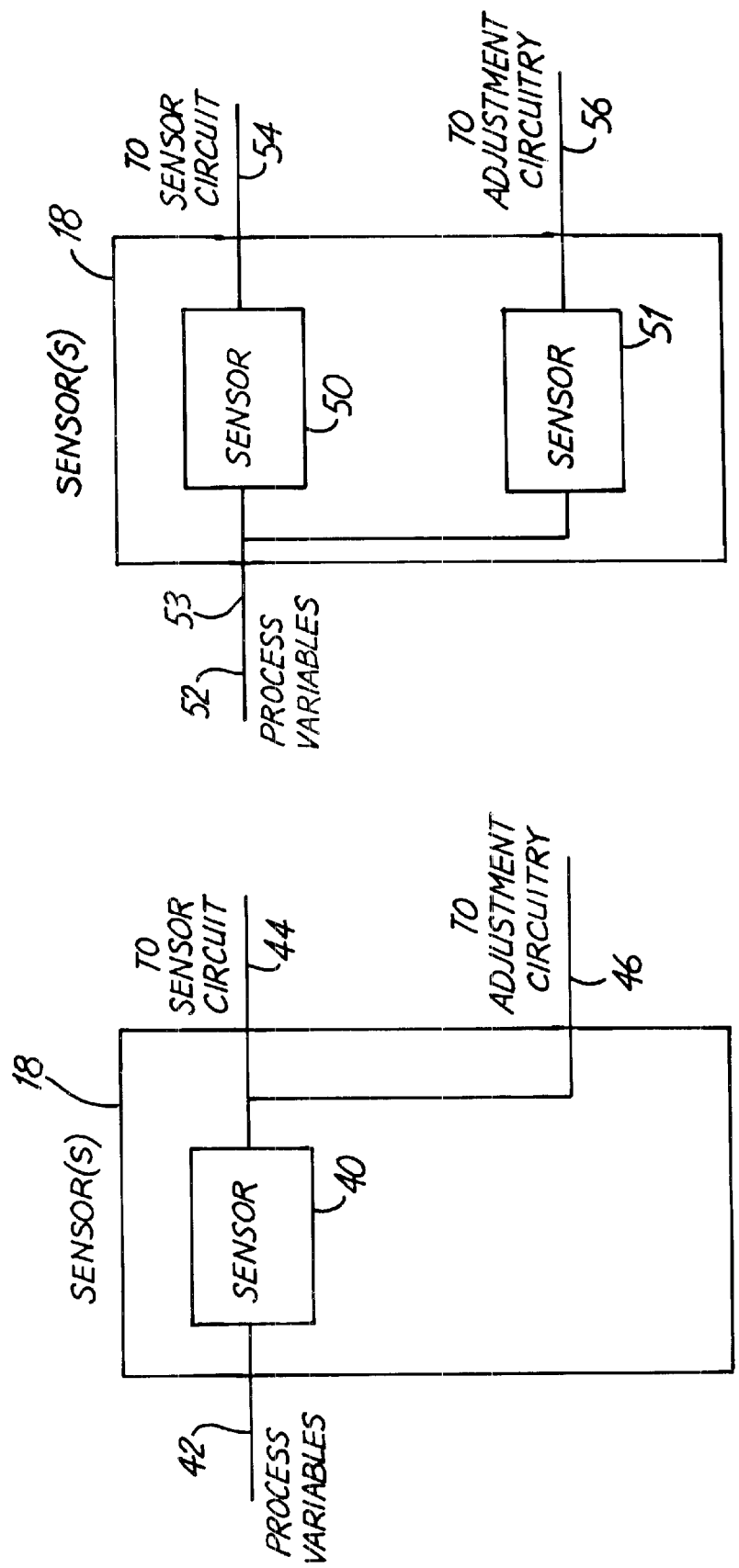

ADJUSTABLE BANDWIDTH FILTER FOR PROCESS VARIABLE TRANSMITTER

FIELD OF THE INVENTION

The present invention relates to process variable transmitters of the type used to monitor fluids in a process plant.

BACKGROUND OF THE INVENTION

Process variable transmitters are used to monitor process variables associated with fluids such as slurries, liquids, vapors and gasses in chemical, pulp, petroleum, gas, pharmaceutical, food and other fluid processing plants. Process variables include pressure, temperature, flow, level, pH, conductivity, turbidity, density, concentration, chemical composition and other fluid properties. A process variable transmitter either includes or is connected to a sensor that senses the process variable and provides an output representing the process variable. The sensor output is connected to signal processing circuitry. Signal processing circuitry typically includes a damping time adjustment for the transmitter output which can be manually set, either locally or remotely. If a transmitter's damping time setting is set high to strongly limit noise, then the transmitter output will respond more slowly when the sensed process variables changes. If the transmitter's damping time is set low so that the transmitter's output responds more quickly, then more noise will pass through from the sensor output to the transmitter output. Other signal filtering which reduces noise tends to introduce more time delay in the transmitter output relative to the process variable.

SUMMARY OF THE INVENTION

In the present invention, a filter automatically adjusts its bandwidth based on noise detected in a sensor output in a process variable transmitter. The process variable transmitter provides a damped transmitter output representing a process variable sensed by a sensor. When the transmitter senses higher sensor noise levels, it automatically decreases the filter bandwidth to damp noise in the transmitter output. When the transmitter senses lower sensor noise levels, it automatically increases the filter bandwidth to provide faster response to changes in the process variable.

BRIEF DESCRIPTION OF THE DRAWINGS

FIGS. 2 and 3 are block diagrams of sensor arrangements for the process variable transmitter of FIG. 1;

DETAILED DESCRIPTION OF THE PREFERRED EMBODIMENTS

Figure 1:
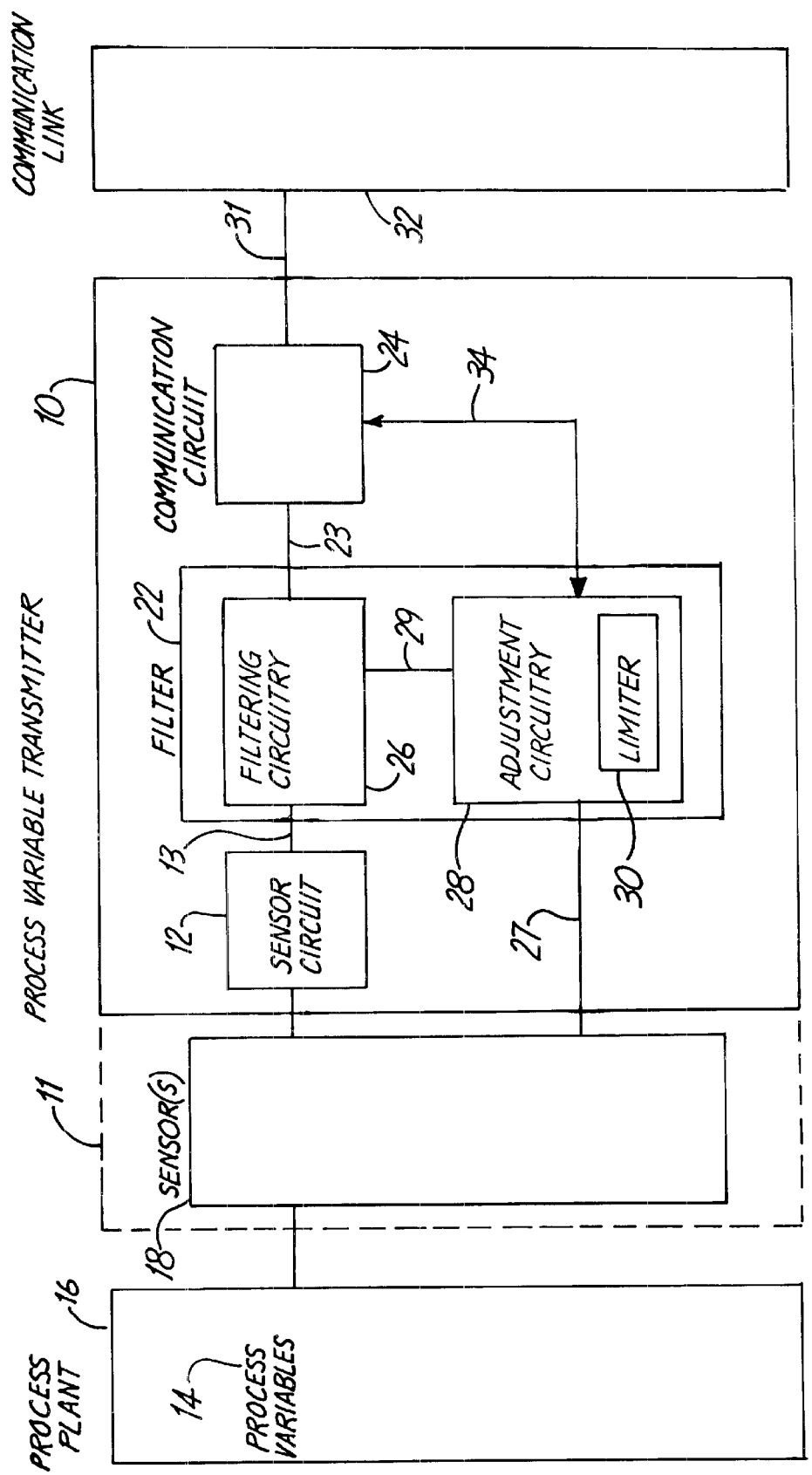
FIG. 1 is a block diagram of a process variable transmitter according to the invention.

In FIG. 1, a process variable transmitter 10 is shown. Process variable transmitter 10 can be configured to monitor a process variable 14 associated with fluids in a process plant 16 such as slurries, liquids, vapors and gasses in chemical, pulp, petroleum, gas, pharmaceutical, food and other fluid processing plants. The monitored process variable 14 can be pressure, temperature, flow, level, pH, conductivity, turbidity, density, concentration, chemical composition or other properties of fluids. Process variable transmitter 10 couples to one or more sensors 18 which can be either external to transmitter 10 or included in transmitter 10 (as shown by dashed line 11), depending on the installation needs of process plant 16. Process variable transmitter 10 comprises a sensor circuit 12 sensing one or more process variables 14 associated with fluids in the process plant 16 via the sensors 18.

A filter 22 in process variable transmitter 10 has a filter input coupled to receive the output from sensor circuit 12 on line 13. The input to filtering circuitry 26 on line 13 is received from the process plant 16 via sensor(s) 18 and sensor circuit 12. Filter 22 has a bandwidth that automatically decreases at higher sensor noise levels to damp noise received from sensors 18. The bandwidth of filter 22 automatically increases at lower sensor noise to provide better response.

The term "noise" as used in this application means any unwanted disturbance in a variable. It includes both deviations from a correct value as well as variations that do not deviate from a correct value but are in a frequency range which disturbs the operation of the transmitter or a system receiving the transmitter's output. In the case of pressure transmitter coupled to a tank bottom to transmit a tank level signal, sloshing of fluid in the tank can produce actual high frequency, variations of pressure, but these high frequency variations are not changes in the quantity of fluid in the tank and can thus be treated as noise.

The output of the filtering circuitry 26 on line 23 is bandwidth limited by the filtering circuitry and represents the magnitude of the process variable. Filtering circuitry 26 typically comprises a low pass circuit with an adjustable cutoff or bandwidth controlled by adjustment circuitry 28. Adjustment circuitry 28 receives a second signal on line 27 from the process plant 16 via sensor(s) 18 and provides an output on line 29 to filtering circuitry 26 which controls or adjusts the bandwidth or cutoff frequency of filtering circuitry 26. Adjustment circuitry 28 includes a limiter circuit 30 which limits the range of adjustment of the bandwidth of filter 22. The limiter circuit 30 limits the automatic bandwidth adjustment to a prescribed range to keep the transmitter output on line 31 within specification limits. The limiter circuit 30 receives information for adjusting the prescribed range from the communication link 32 via communication circuit 24 and lines 31 and 34. Filter 22 can be implemented as an analog filter, a digital filter, software executing in an embedded microcomputer or a combination of these techniques.

The communication circuit 24 has an input that receives the output of filter 22 on line 23. Communication circuit 24 provides a transmitter output on line 31 representing the monitored process variable and having damping automatically adjusted for sensor noise. The communication circuit 24 couples the transmitter output representative of the process variable to the communication link 32. The communication circuit 24 can also be adapted to provide an additional output indicating the bandwidth to communication link 32. Additionally, communication circuit 24 can be adapted to pass a command from the communication link 32 to adjustment circuitry 28 which further adjusts the bandwidth by way of setting limits or overriding the automatic bandwidth adjustment with a command from a control system (not shown).

Typically, the communication link 32 will be a 2 wire, 4–20 mA current loop which provides all of the transmitter's energization and has digital signals superimposed on the 2 wire current loop according to a process control industry standard such as the HART® digital protocol. In this arrangement, the low frequency 4–20 mA energization current has a magnitude which is controlled by the transmitter and represents the monitored process variable. Other process control industry communication link arrangements known as fieldbus protocols can also be used.

In FIGS. 2 and 3, alternate arrangements of sensor(s) 18 in FIG. 1 are shown. In FIG. 2, a single sensor 40 senses a process variable 14 (FIG. 1) at 42 and provides a sensor output on line 44 to sensor circuit 12 (FIG. 1), and also provides the same sensor output on line 46 to adjustment circuitry 28 (FIG. 1). In the embodiment shown in FIG. 2, the noise in the process variable itself is used to adjust the bandwidth of filtering.

In FIG. 3, sensor(s) 18 include a sensor 50 sensing a first process variable 52 and second sensor 51 sensing a secondary process variable 53. Sensor 50 provides a sensor output on line 54 to sensor circuit 12 (FIG. 1); sensor 51 provides a secondary sensor output on line 56 to adjustment circuitry 28 (FIG. 1). The arrangement in FIG. 3 is used where a second process variable provides a better indication of the noise level in the sensor circuit output at 54 than the indications of noise in the sensor circuit output itself. The arrangement of FIG. 3 is used, for example, when the noise in the sensor circuit output is near the same frequency range as the frequency of variations in the sensed process variable, but a second process variable has either a magnitude or noise that is covariant with the noise in the sensor circuit output. In a situation where a magnetic flow sensor becomes noisier with noisier conductivity, a conductivity sensor can be used to adjust bandwidth for filtering the flow sensor circuit output, for example. In the arrangement of FIG. 3, the sensor circuit 18 senses a secondary variable 53 and the filter adjusts its bandwidth based on the secondary variable.

Figure 4:
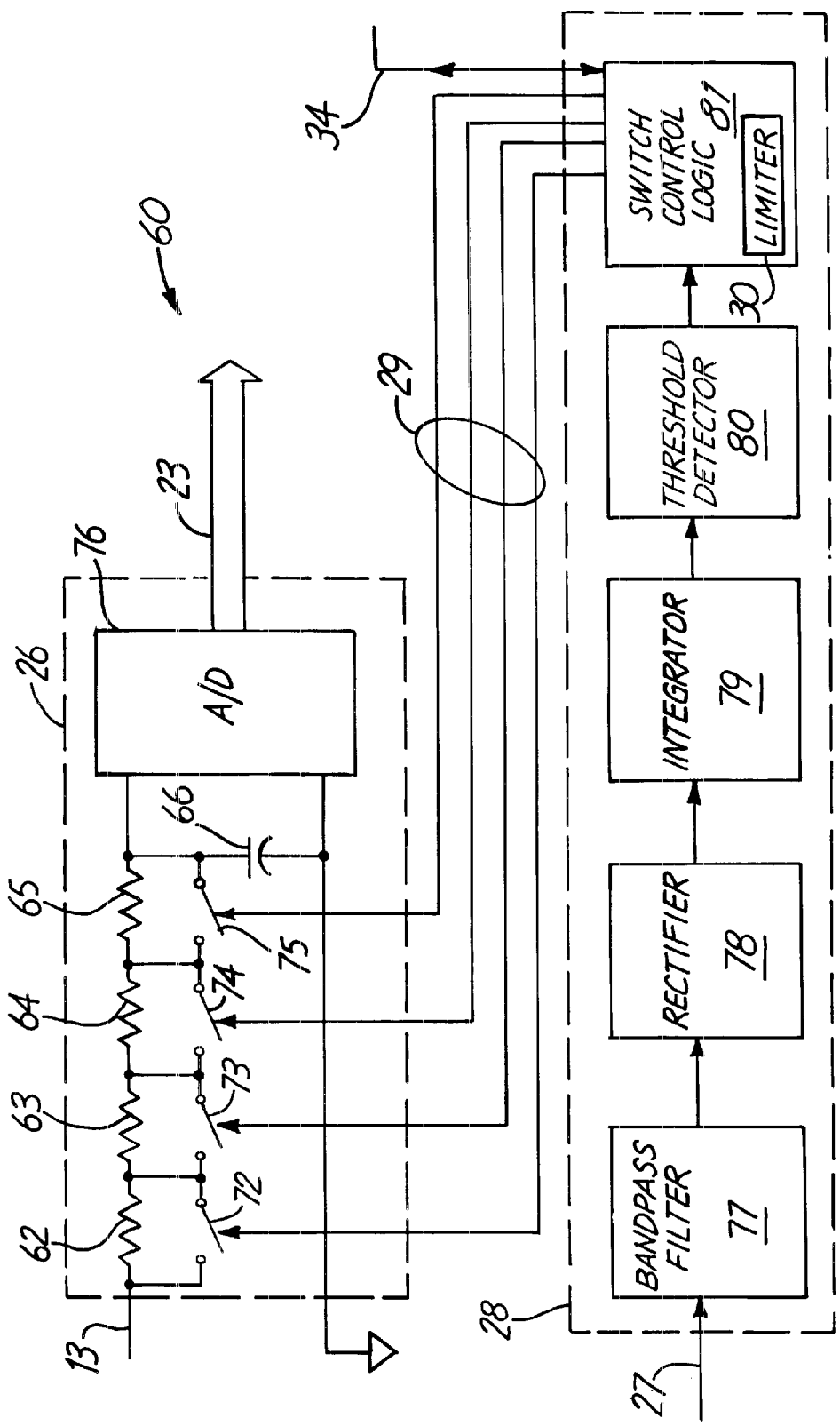
FIG. 4 is a partial schematic, partial block diagram of an embodiment of a filter according to the invention.

In FIG. 4, a filter 60 is shown which is a preferred embodiment of filter 22 in FIG. 1. In FIG. 4, some elements are numbered to correspond with similar elements in FIG. 1 for clarity. In FIG. 4, a sensor circuit output is coupled on line 13 to filtering circuitry 26; a second sensor signal is coupled on line 27 to adjustment circuitry 28; an adjustment or control output from the adjustment circuitry 28 is coupled along lines 29 to a bandwidth control input of filtering circuit 26. Filter 60 includes a limiter 30. Limiter 30 sets limits of adjustment in order to keep the time response and error in the transmitter output within specification limits. The limits can be changed by a control signal on line 34. The control signal on line 34 can change the limits when commanded to do so by a control system connected to the communication link, or it can do so based on a change in the process variable as represented at the output of filtering circuit 26.

In FIG. 4, a sensor circuit output is received at line 13, adjustably filtered to remove noise by filtering circuit 26 and a filtered output is provided on bus 23 in digital form. In filtering circuit 26 of FIG. 4, an RC low pass filter is comprised of resistors 62, 63, 64, 65 and capacitor 66. The cutoff frequency of the low pass filter can be adjusted by closing selected combinations of switches 72, 73, 74, 75. An analog to digital converter 76 converts the potential across capacitor 66 to a digital signal for transmission on bus 23 to a communication circuit (shown in FIG. 1). A second signal, also containing noise, is received on line 27. Bandpass filter 77 filters the noisy signal on line 27 to selectively pass the noise, which is typically of a higher frequency than the process variable. The noise at the output of filter 77 is coupled to rectifier 78 which rectifies the noise so that is has a single polarity. The single polarity noise at the output of rectifier 78 is coupled to integrator 79 which computes an average value of the noise and provides the average value to threshold detector 80. Threshold detector 80 senses whether the average noise is above or below preselected thresholds and provides a digital output signal to switch control logic 81 which logically combines the noise threshold data to provide a control or adjustment signal on lines 29 to control the switches. The switches are controlled so that as the noise increases, the bandwidth of the RC filter decrease to attenuate the noise, which is higher in frequency than the desired process variable information.

Figure 5:
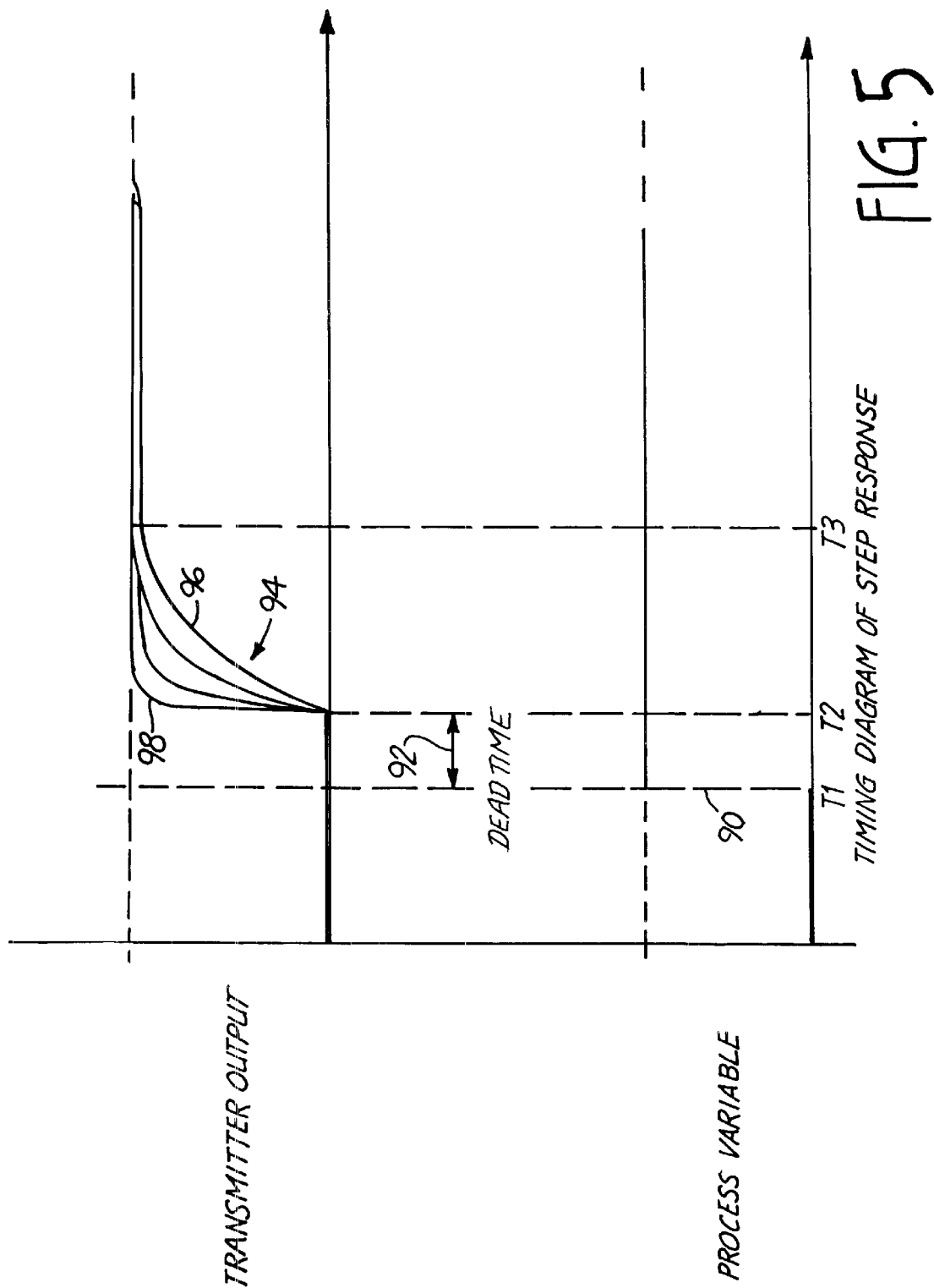
FIG. 5 is a timing diagram of the response of a process variable transmitter according to the present invention.

In FIG. 5, a timing diagram of the automatically adjusting step response of a process variable transmitter output according to the present invention is shown. In FIG. 5 a process variable undergoes several very rapid or "step" change under differing noise conditions as shown at 90. Change in the process variable transmitter output responsive to these step changes is delayed by a dead time 92. Dead time 92 is caused by the delays in the sensor and transmitter circuitry responding. After the dead time, the process variable transmitter output responds to the step change as shown at 94. The response at 94 varies from time to time and does not have a single trajectory, but many trajectories, some faster and some slower. When noise levels are higher, the transmitter automatically adjusts the transmitter output trajectory to be slower at a limit shown at 96. When noise levels are low, the transmitter automatically adjusts the transmitter output trajectory to be faster at a limit shown at 98. No operator intervention is needed to obtain the different trajectories, the transmitter of the present invention adjusts automatically within limits based on noise levels.

Figure 6:
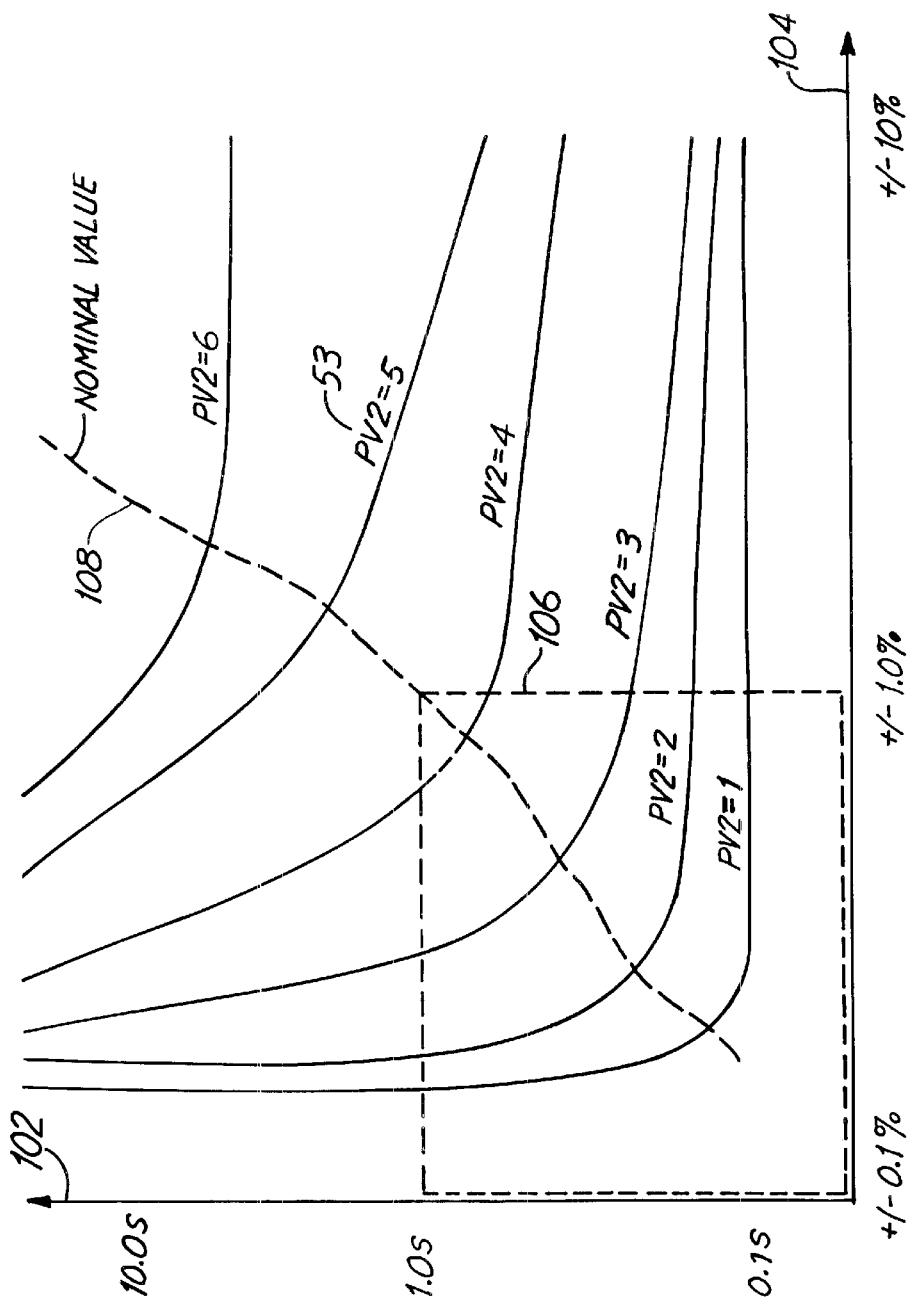
FIG. 6 is a graph of a relationship between delay time and error limit of signal processing circuitry at different values of a secondary process variable $PV_2$.

FIG. 6 illustrates one example relationship between delay time 102 and error limit 104 of signal processing circuitry 16 and secondary process variable 53 ($PV_2$). Adjustment circuitry 28 adjusts filtering circuitry 26 to a nominal value 108 of delay time and error limit for signal processing the sensor circuit output on line 12 ($PV_1$) as a function of $PV_2$. The nominal combination may be selected based on noise from either $PV_1$ (FIG. 2), another process variable (FIG. 3) or a combination thereof. The nominal value is chosen to maintain operation of transmitter 10 balanced between speed and error in comparison to the transmitter's performance specification box 106. The filtering and limits set in limiter 30 are thus adjusted for a preferred balance, along nominal value line 108 between error and time delay as a function of $PV_2$. The nominal value information is stored in the limiter. It is, of course, possible for the transmitter to receive a command from communication link 32 to temporarily operate "out of the box" (specification box 106) and provide either low error limits or low time delay. The parametric curves and limits shown in FIG. 6 will have different shapes for each transmitter design and performance specification.

Figure 7:
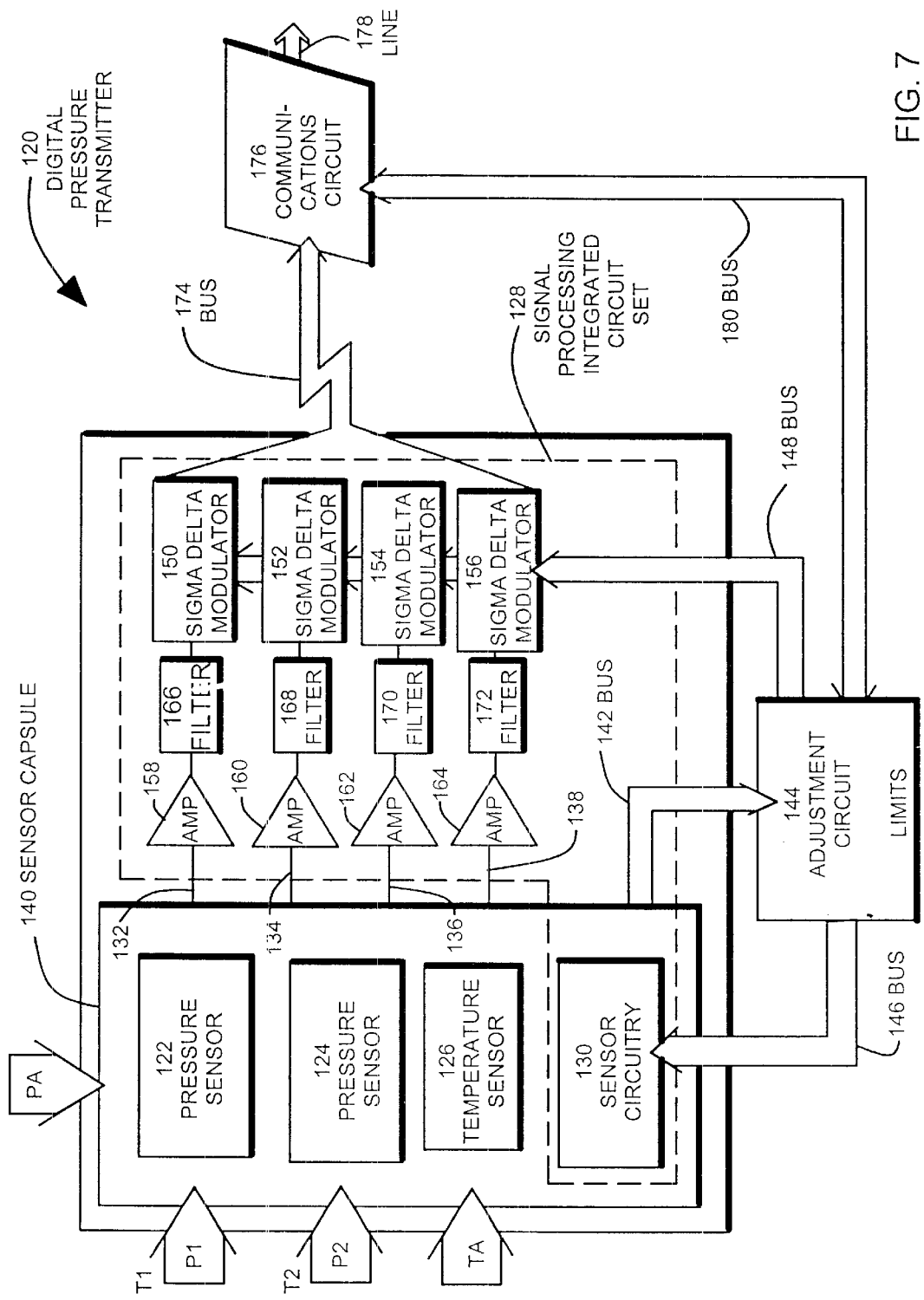
FIG. 7 is a block diagram of an embodiment of a pressure transmitter according to the invention.

In FIG. 7, a digital pressure transmitter embodiment 120 is shown. In FIG. 7, transmitter 120 is a differential pressure transmitter transmitting a transmitter output representative of the difference between process variables which are fluid pressures P1 and P2 in a process plant. The transmitter 120 is also subject to the environment in the process plant, namely local ambient pressure PA and local electronics temperature TA. Pressure sensor 122 receives pressure P1 and is subject to fluid temperature T1. Pressure sensor 124 receives pressure P2 and is subject to fluid temperature T2. Temperature sensor 126 senses the temperature of the transmitter's electronic circuitry. Sensors 122, 124 are typically capacitive pressure sensors that have a pressure sensitive capacitance and a reference capacitance as well as a temperature sensing resistor. Sensors 122, 124 can be in transmitter 120 as shown, or may be located remotely from the transmitter along with some support circuitry. A signal processing integrated circuit set 128 includes sensor circuitry 130, which is typically a switching circuit. Sensor circuitry 130 couples to the sensors 122, 124, 126 and provides sensor circuit outputs 132, 134, 136, 138 representing the process variables. Sensor circuit output 132 represents the difference in pressures ΔP=P2−P1. Sensor output 134 represent pressure P1. Sensor output 136 represents pressure P2. Sensor output 138 represents a temperature in the transmitter's electronics TA. The sensors 122, 124, 126 and signal processing circuit 130 can be physically arranged in a sensor capsule 140 which can be calibrated separately from other transmitter electronics, if desired.

Circuit 130 also provides outputs representative of the process variables along bus 142 to adjustment circuit 144. Adjustment circuit 144 senses noise in the received outputs representative of process variable, and sends commands along busses 146 and 148. The command sent on bus 146 to signal processing circuit 130 changes the signal processing circuit 130 so that it filters out noise in the signals it delivers on lines 132, 134, 136 and 138. Typically, signal processing circuit 130 includes digital switching circuitry and the command on line 146 selects different patterns or timing of switching based on the noise levels to effect bandwidth limited filtering. The command which adjustment circuit 144 provides on buss 148 is coupled to variable frequency sigma delta (ΣΔ) modulators 150, 152, 154, 156 to alter the timing of switching in the sigma delta modulators, if needed, to adjust further bandwidth limiting for noise. The output representing pressure difference on line 132 is coupled via amplifier 158 and filter 166 to sigma delta modulator 150. The output representing pressure P1 on line 134 is coupled via amplifier 160 and filter 168 to sigma delta modulator 152. The output representing pressure P2 on line 136 is coupled via amplifier 162 and filter 170 to sigma delta modulator 154. The output representing temperature on line 126 is coupled via amplifier 164 and filter 172 to sigma delta modulator 156. The sigma delta modulators provide a preferred high accuracy, low dead time conversion from analog to digital format for the sensor signals. Digital representations of all of the sensed process variables, ΔP, P1, P2, TA from sigma delta modulators 150, 152, 154, 156 respectively are coupled along bus 174 to communication circuit 176. Communication circuit 176 couples along line 178 to a communication link (not shown). The communication circuit 176 communicates with the adjustment circuit 144 along buss 180. Commands from the communication link to the adjustment circuit can be coupled along line 180 for adjusting the limits set in circuit 180. Circuit 144 can couple information about its adjustments for noise along bus 180 to the communication circuit 176 for transmission to the communication link.

Adjustment circuit 144 can also perform other adjustment functions, if desired, such as compensation the pressure measurements for the temperatures of the sensors and electronics, correcting differential measurements for line pressure effects (if sensors 122 and 124 are formed as a single device), linearization or diagnostics depending on the needs of the application. Adjustable bandwidth adjustment for noise may be performed in either signal processing circuit 130 or the sigma delta modulators or some in both places.

Figure 8:
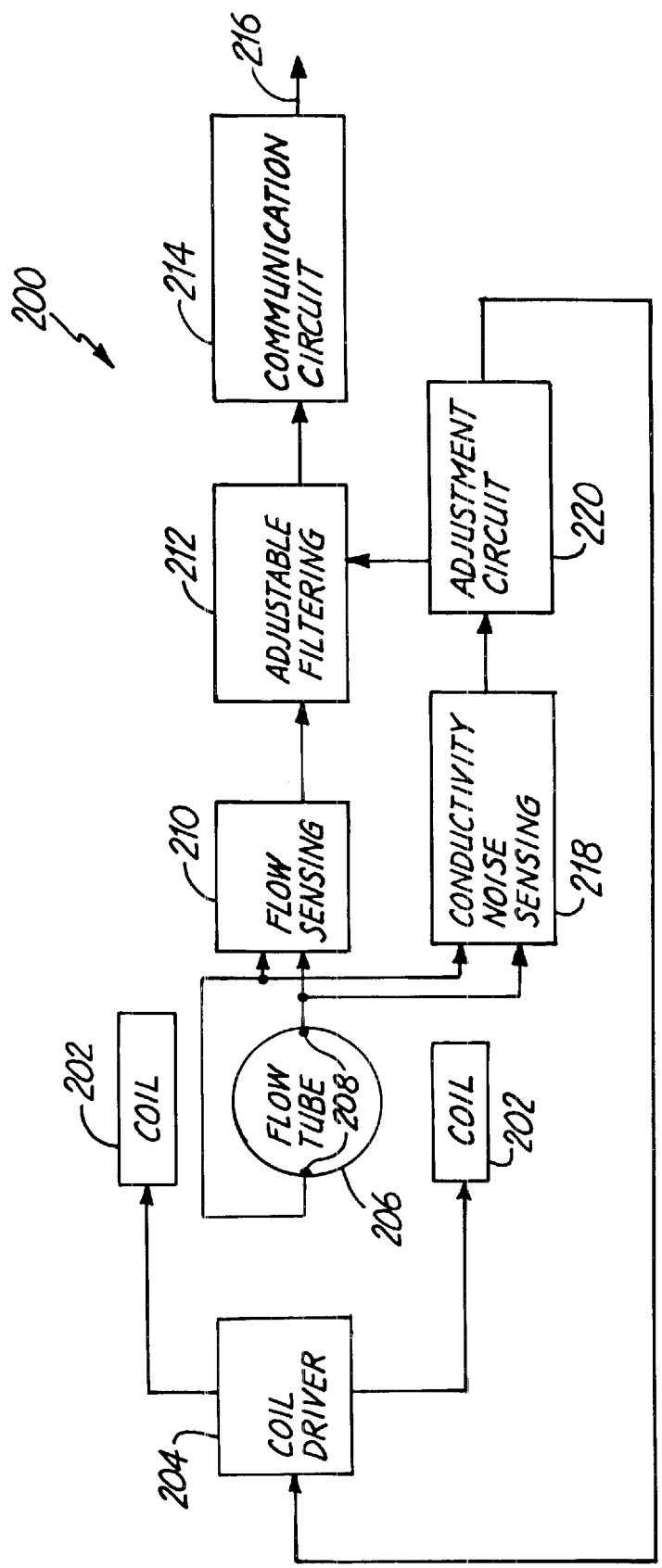
FIG. 8 is a block diagram of an embodiment of a magnetic flow meter according to the invention.

In FIG. 8, a magnetic flow meter 200 is shown. In FIG. 8, a pair of coils 202 are excited by a coil driver 204 to produce a pulsed, alternating or sinusoidal magnetic field in a flow tube 206. Flow tube 206 contains liquid flowing through the magnetic field. The motion of the fluid through the magnetic field induces a correspondingly pulse, alternating or sinusoidal voltage between electrodes 208. The induced voltage between electrodes 208 has a frequency that is synchronous with the magnetic field and has an amplitude representative of the magnitude of the flow in flow tube 206. Flow sensing circuit 210 senses and amplifies the induced voltage and provides an amplified flow output to adjustable filter 212. Adjustable filter 212 has a bandpass which limits the bandwidth and provides an output to communication circuit 214 which is damped according to the bandwidth limiting. Communication circuit 214 provides an output 216 representative of flow which can be transmitted to a communication link (not shown). Conductivity noise sensing circuit 218 provides a conductivity sensing current which flows through electrodes 208 and fluid contained in flow tube 206. The frequency of the conductivity noise sensing current is different than that of the frequency of the magnetic field so that conductivity sensing does not interfere with flow sensing. The conductivity noise sensing circuit 218 senses the voltage across the electrodes in a frequency range near the frequency of the conductivity noise sensing current and measures the amount of noise in the conductivity of the fluid. The noise measured by conductivity noise sensing circuit 218 is provided to adjustment circuit 220. Adjustment circuit 220 generates a bandwidth controlling signal based on the measured noise. When the conductivity noise level is higher, the adjustable filter 212 is automatically adjusted to a narrower bandwidth, in other words, more damping is applied. When the conductivity noise level is lower, the adjustable filter 212 is automatically adjusted to a wider bandwidth, in other words, less damping is applied. An acceptable output is automatically obtained from communication circuit 214 under a variety of noise conditions without providing excess damping at times when there are low levels of noise from the electrodes 208. Magnetic flow meter 200 can thus be used with a variety of transient fluid conditions such as bubbles, incompletely mixed chemicals and particles without need for operator intervention to adjust for transient noise conditions.

In FIG. 8, the adjustment circuit 220 can alternately control the coil driver instead of the adjustable filter. When noise in a band near the excitation frequency is encountered, the adjustment circuit 220 can control the coil driver to provide a different excitation frequency. In FIG. 8, it is also possible for the adjustment circuit to receive its noise input signal form the flow sensing circuit 210, in which case the conductivity noise sensing circuit 218 can be eliminated.

Figure 9:
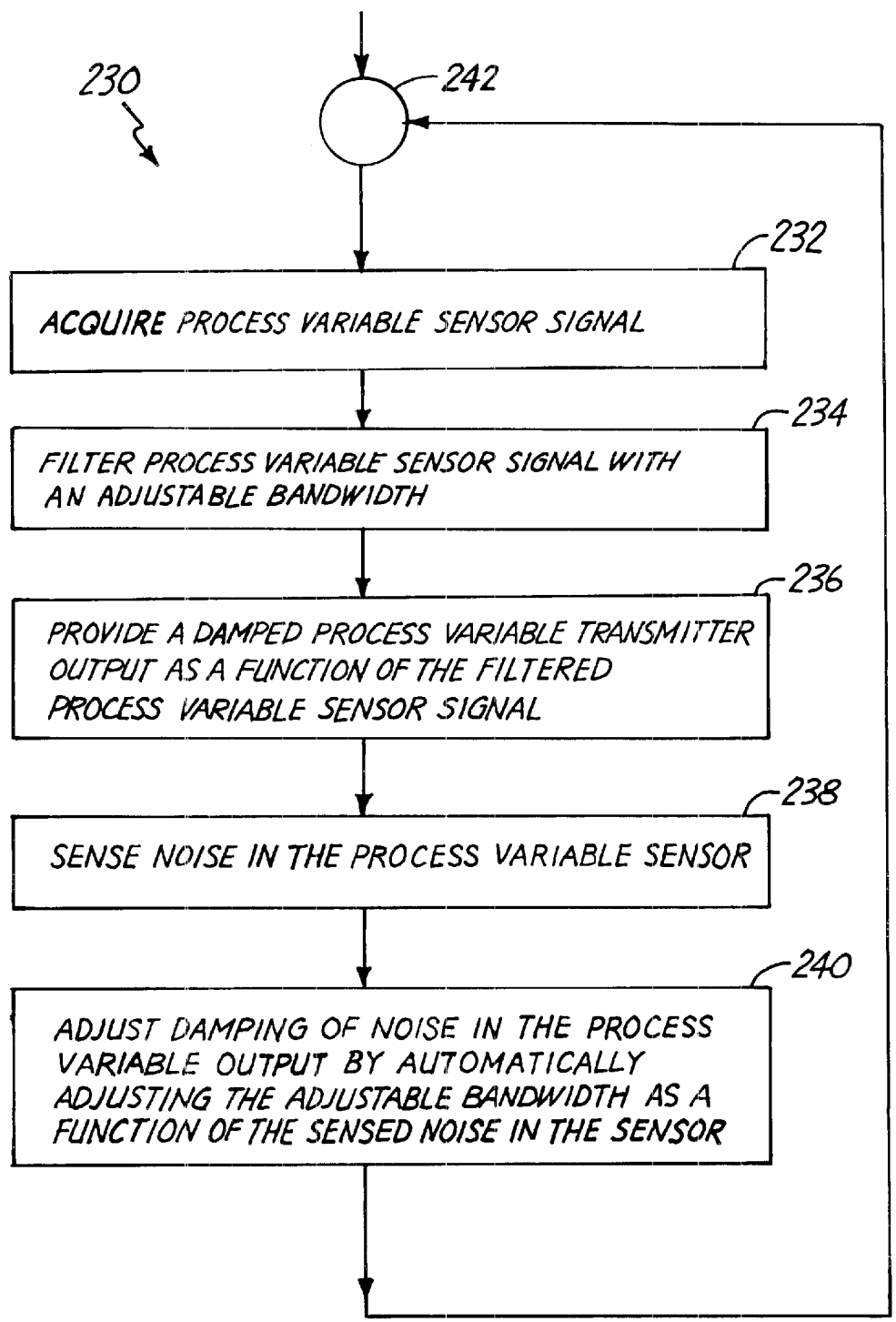
FIG. 9 is a flow chart of a method of signal processing according to the invention.

In FIG. 9, one embodiment 230 of a process sequence is shown. Process elements 232, 234, 236, 238, 240 as shown in FIG. 9 are performed and then the process returns to the beginning at 242 to perform the elements iteratively. The starting point and particular order in which the elements are performed can be varied since the elements are performed iteratively. The sequence of process elements can also be interrupted by other processes in the transmitter as needed, and then continued after the other processes are serviced.

Figure 10:
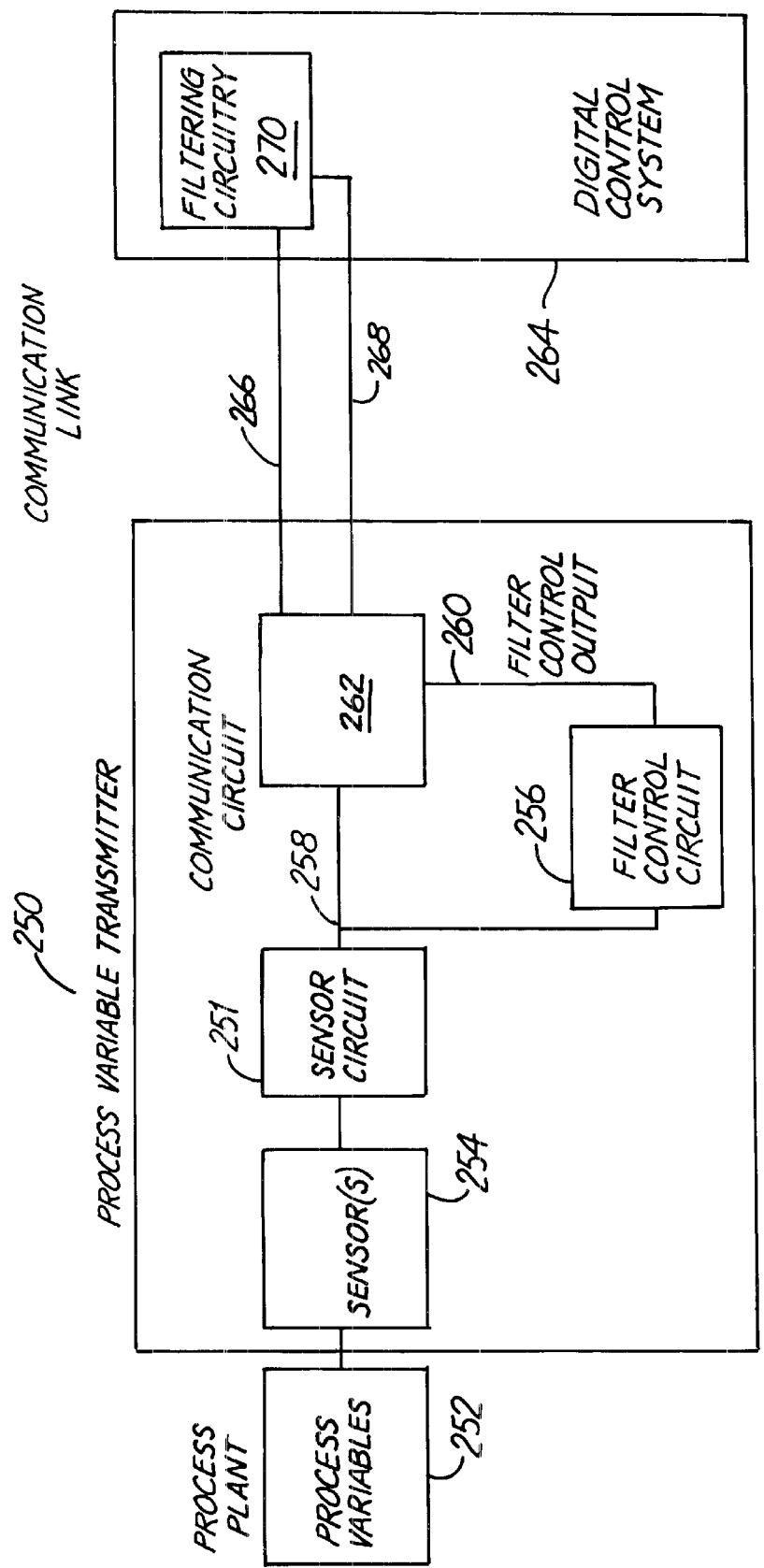
FIG. 10 is a block diagram of a process variable transmitter.

In FIG. 10, A process variable transmitter 250 is shown. In FIG. 10, a sensor circuit 251 is adapted to sense a process variable 252 via sensor 254. Sensor circuit 251 has sufficient bandwidth to pass noise signals. Filter control circuit 256 couples to the sensor circuit output at 258 and generates a filter control output 260 indicating a bandwidth that automatically decreases at higher sensor noise to damp noise, and automatically increases at lower sensor noise. A communication circuit 262 couples to the filter control circuit 256 and the sensor circuit 251 and is adapted to couple to a digital control system 264. The communication circuit 262 provides a first transmitter output 266 representing the process variable and provides a second transmitter output 268 representing the filter control output whereby the digital control system 264 can automatically adjust digital control system filtering 270 for sensor noise.

Figure 11:
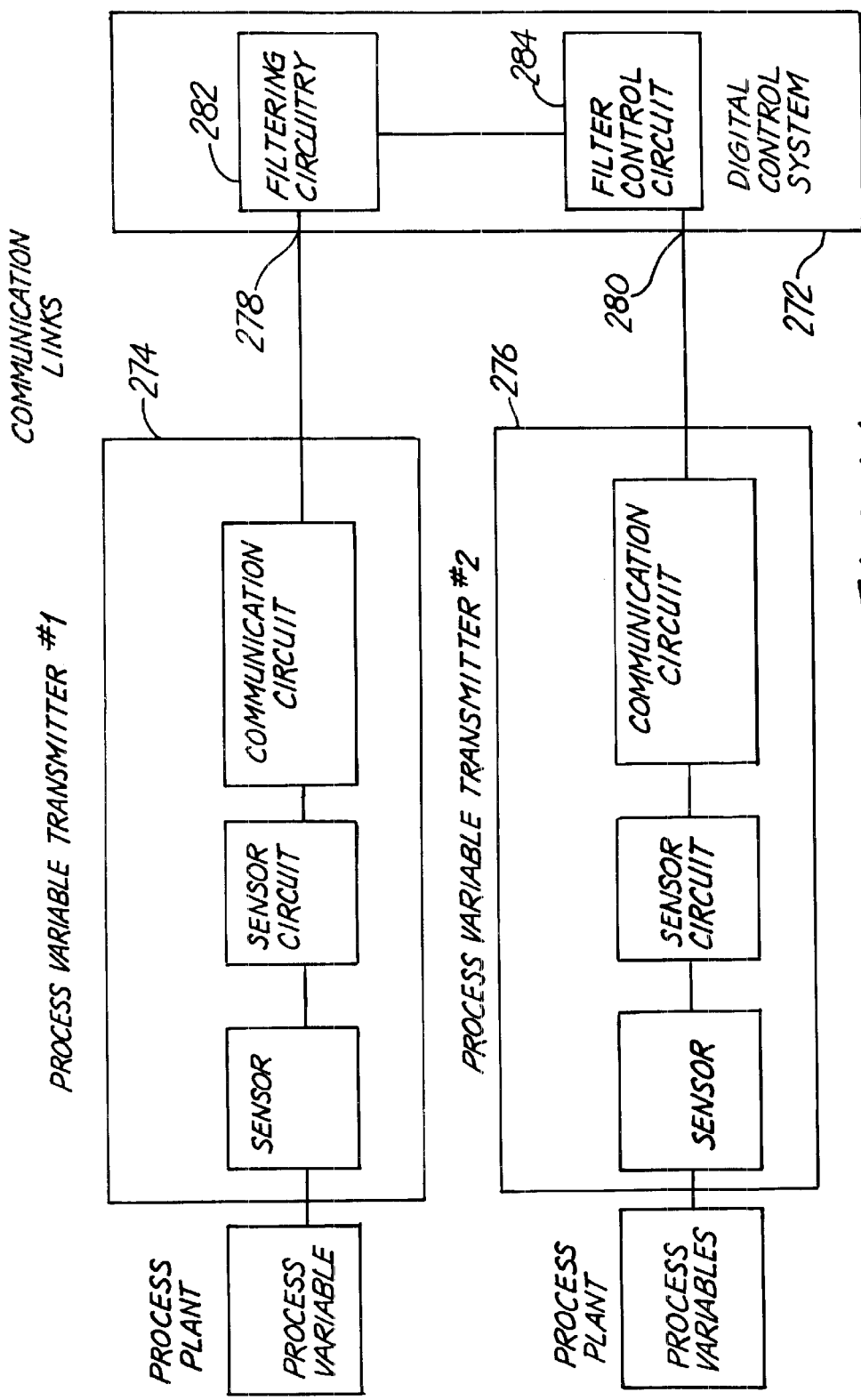
FIG. 11 is a block diagram of a control system arrangement with an adjustable bandwidth filter.

In FIG. 11, a digital control system 272 is adapted for coupling to process variable transmitters 274 and 276. The digital control system 272 has a first transmitter input 278 adapted to couple to the first transmitter 274 providing a first process variable to the digital control system 272. The digital control system 272 has a second transmitter input 280 adapted to couple to the second transmitter 276 providing a second process variable known to correlate with noise in the first process variable. The digital control system 272 has a filtering circuit 282 receiving and filtering the first transmitter input 278 with an adjustable bandwidth set by the second process variable 280 such that bandwidth decreases when noise in the first process variable increases. The digital control system 272 further comprises a filter control circuit 284 receiving the second process variable and providing a control signal to the filtering circuit which sets bandwidth. Such filtering in a digital control system can be accomplished by adjusting tuning of a control loop.

Figure 12:
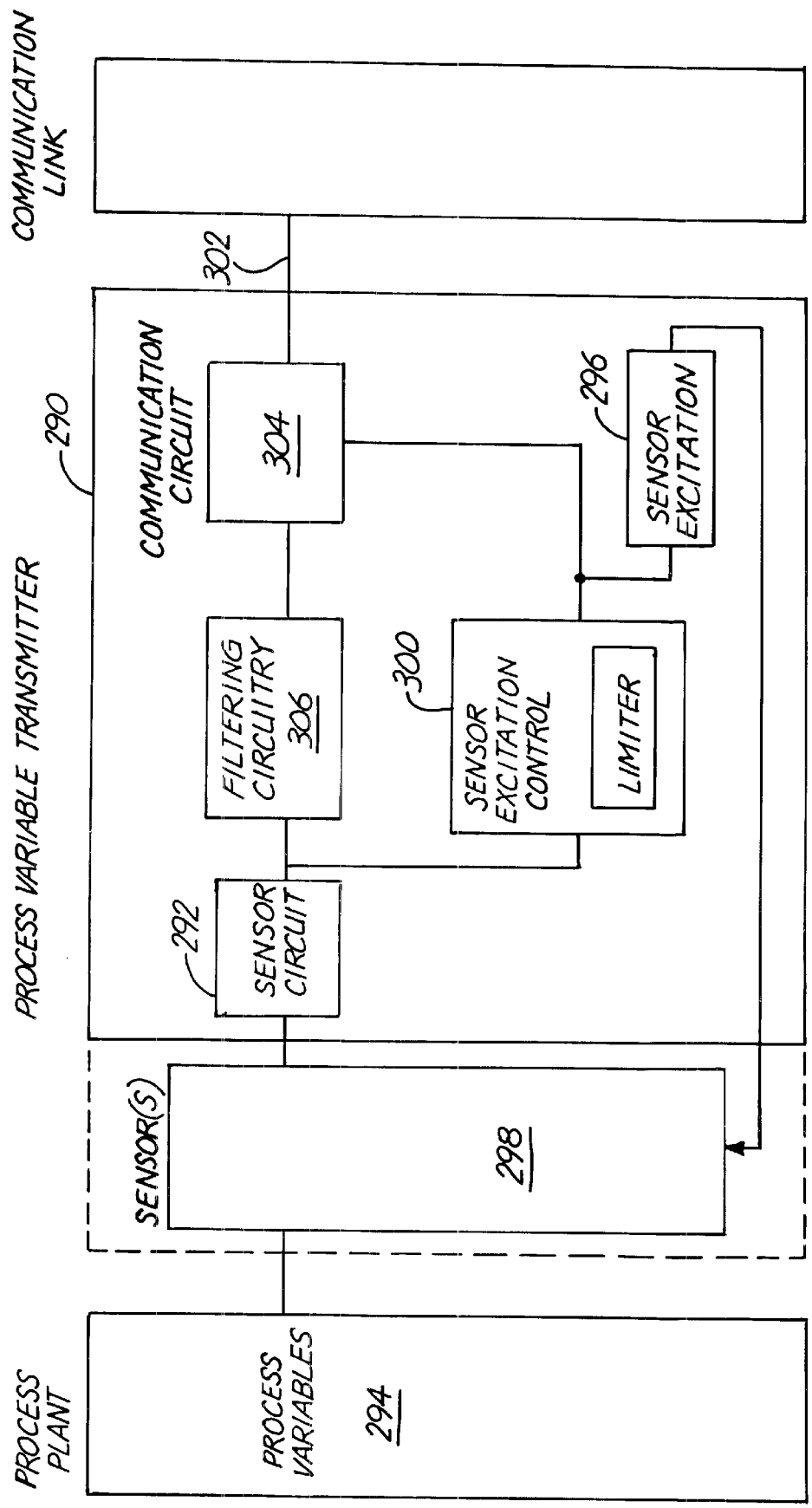
FIG. 12 is a block diagram of a transmitter in which sensor excitation is varied to effectively compensate for noise.

In FIG. 12, a process variable transmitter 290 comprises a sensor circuit 292 adapted to sense a process variable 294 a sensor excitation circuit 296 is adapted to excite a sensor 298. A sensor excitation control circuit 300 receives a signal from the sensor circuit 292 and controls the excitation provided by the sensor excitation circuit 296. The sensor excitation circuit 296 adjusts the excitation as a function of noise in the sensor circuit signal to reduce noise in a transmitter output 302. A communication circuit 304 coupled to the filtering circuit 306, which need not be adjustable, provides the transmitter output 302 representing the process variable automatically adjusted for sensor noise. The excitation frequency can be adjusted to avoid noise. The excitation amplitude can also be adjusted to avoid noise by increasing signal to noise ratio when noise is higher. The transmitter 290 of FIG. 12 can be a magnetic flow transmitter, for example and the frequency of the coil excitation is adjusted to moved the sensor signal away from a noise frequency.

Although the present invention has been described with reference to preferred embodiments, workers skilled in the art will recognize that changes may be made in form and detail without departing from the spirit and scope of the invention. For example, the various function blocks of the invention have been described in terms of circuitry, however, the function blocks may be implemented in any form, digital, analog, software, or their hybrids. When implemented in software, a microprocessor performs the functions and the signals comprise digital values on which the software operates. A general purpose processor programmed with instructions that cause the processor to perform the desired process elements, application specific hardware components that contain circuits wired to perform the desired elements and any combination of programming a general purpose processor and hardware components can be used.

Because of the nature of complex digital circuitry, sensor circuitry, adjustment circuitry and filter circuitry are typically not in easily partitioned blocks like analog circuitry, but components used for the various functions are intermingled and shared. Likewise with software implementations, typically a single microprocessor will execute instructions that have shared adjustment, filtering and sensor circuitry functions.

What is claimed is:

1. A process variable transmitter, comprising:
    a sensor circuit adapted to sense a process variable and provide at least one sensor output;
    a filter coupled to the sensor circuit and having a bandwidth that automatically decreases as sensor noise increases at the at least one sensor output to damp noise, and automatically increases as sensor noise decreases at the at least one sensor output; and
    a communication circuit coupled to the filter and providing a transmitter output representing the process variable and having damping automatically adjusted for sensor noise.

2. The process variable transmitter of claim 1 wherein the filter further comprises a limiter circuit which limits the automatic bandwidth increases and decreases to a prescribed range to keep the transmitter output within specification limits.

3. The process variable transmitter of claim 2 wherein the prescribed range is adjustable.

4. The process variable transmitter of claim 3 wherein the communication circuit is couplable to a communication link and the limiter circuit receives information adjusting the prescribed range from the communication link.

5. The process variable transmitter of claim 1 wherein the sensor circuit couples to a sensor which is external to the process variable transmitter.

6. The process variable transmitter of claim 1 further comprising a sensor coupled to the sensor circuit.

7. The process variable transmitter of claim 1 wherein the sensor circuit further senses a secondary variable and the filter adjusts the filter's bandwidth based on the secondary variable.

8. The process variable transmitter of claim 1 wherein the bandwidth filter is an adjustable analog filter.

9. The process variable transmitter of claim 1 wherein the bandwidth filter is an adjustable digital filter.

10. The process variable transmitter of claim 1 further comprising an embedded microcomputer controlling the automatic bandwidth filtering.

11. A process variable transmitter couplable to a process plant, comprising:
    filtering circuitry adapted to receive a first signal from the process plant and to provide a filtered signal which is bandwidth limited by the filtering circuitry and which represents the magnitude of a process variable;
    communication circuitry adapted to receive the filtered signal and to transmit a transmitter output signal representing the process variable to a communication link; and
    adjustment circuitry adapted to receive a second signal that includes noise from the process plant and to automatically adjust the bandwidth of the filtering circuitry to reduce noise in the transmitter output signal as a function of the noise included in the second signal.

12. The process variable transmitter of claim 11 further comprising a sensor, the sensor providing the first signal.

13. The process variable transmitter of claim 12 wherein the sensor includes a pressure sensor.

14. The process variable transmitter of claim 11 wherein the first signal and the second signal are the same signal.

15. The process variable transmitter of claim 11 wherein the second signal represents a secondary variable and is different than the first signal.

16. The process variable transmitter of claim 11 wherein the communication circuitry is further adapted to provide an output indicative of the bandwidth.

17. The process variable transmitter of claim 11 wherein the communication circuitry is adapted to receive a command from the communication link and the adjustment circuitry further adjusts the bandwidth based upon the command.

18. The process variable transmitter of claim 11 wherein the filtering circuitry is implemented in software adapted for execution by an embedded microprocessor.

19. The process variable transmitter of claim 11 wherein the filtering circuitry includes a filter implemented in analog circuitry.

20. The process variable transmitter of claim 11 wherein the filtering circuitry includes a filter implemented in digital circuitry.

21. The process variable transmitter of claim 11 wherein the communication circuitry is adapted to couple to a two wire process monitoring loop.

22. The process variable transmitter of claim 21 wherein the two wire process monitoring loop provides all of the transmitter's energization current.

23. The process variable transmitter of claim 11 wherein the transmitter output signal represents flow.

24. A method for filtering a process variable sensor signal, comprising:

receiving a process variable sensor signal from a sensor;

sensing noise in the process variable sensor signal;

filtering the process variable sensor signal with an adjustable bandwidth filter;

generating a damped process variable transmitter output as a function of the filtered process variable sensor signal; and adjusting damping of noise in the damped process variable transmitter output by automatically adjusting the adjustable bandwidth filter as a function of the sensed noise in the process variable sensor signal.

25. The method of claim 24 wherein the process variable sensor signal is a magnetic flow meter electrode signal and the sensed noise is conductivity noise in the magnetic flow meter electrode signal.

26. A computer-readable medium having stored thereon a plurality of sequences of instructions, the plurality of sequences of instructions including sequences of instructions which, when executed by a processor, cause the processor to perform the sequence:

acquiring a process variable sensor signal from a sensor;

filtering the process variable sensor signal with an adjustable bandwidth filter;

providing a damped process variable transmitter output as a function of the filtered process variable sensor signal;

sensing noise in the process variable sensor signal; and adjusting damping of noise in the damped process variable transmitter output by automatically adjusting the adjustable bandwidth filter as a function of the sensed noise in the process variable sensor signal.

27. A process variable transmitter, comprising:

a sensor circuit sensing a process variable and providing at least one sensor output;

a filter coupled to the sensor circuit and having an adjustable bandwidth;

a communication circuit coupled to the filter and providing a damped transmitter output representing the process variable; and means for sensing sensor noise and for automatically adjusting the adjustable bandwidth to increase the damping as sensor noise increases at the at least one sensor output and to decrease the damping as sensor noise decreases at the at least one sensor output.

28. A process variable transmitter, comprising:

a sensor circuit adapted to sense a process variable;

a filter control circuit coupled to the sensor circuit and having a filter control output indicating a bandwidth that automatically decreases at higher sensor noise to damp noise, and automatically increases at lower sensor noise; and a communication circuit coupled to the filter control circuit and the sensor circuit and adapted to couple to a digital control system, the communication circuit providing a first transmitter output representing the process variable and providing a second transmitter output representing the filter control output.

29. A digital control system adapted for coupling to process variable transmitters, comprising:

a first transmitter input adapted to couple to a first transmitter providing a first process variable;

a second transmitter input adapted to couple to a second transmitter providing a second process variable known to correlate with noise in the first process variable; and a filtering circuit receiving and filtering the first transmitter input with an adjustable bandwidth set by the second process variable such that bandwidth decreases when noise in the first process variable increases.

30. The digital control system of claim 29 further comprising a filter control circuit receiving the second process variable and providing a control signal to the filtering circuit.

* * * * *